Oct. 11, 1927.
F. LANG
1,645,199
TWO-CYCLE INTERNAL COMBUSTION ENGINE
Filed May 5, 1923
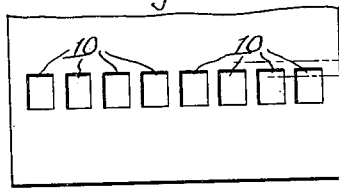
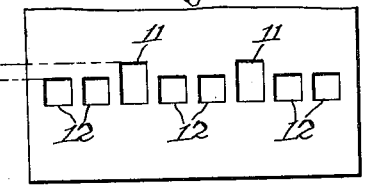
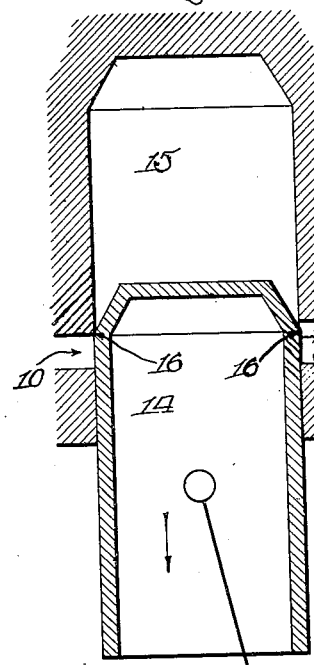
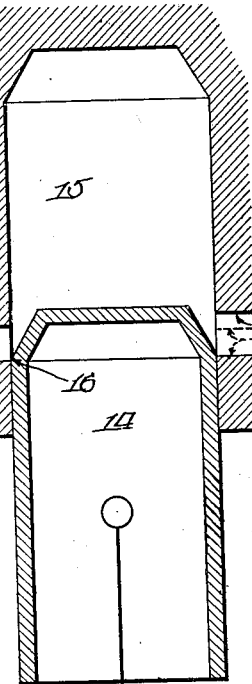
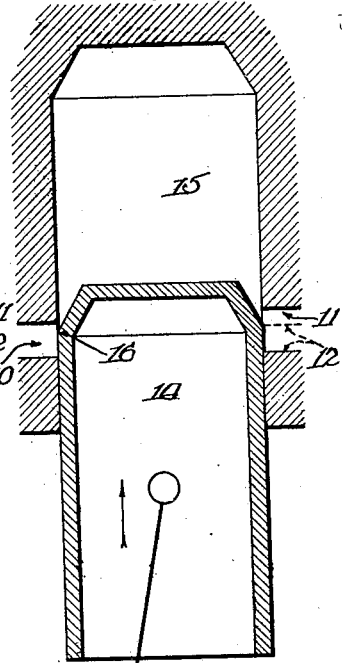
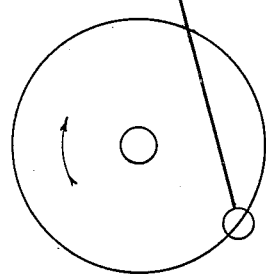
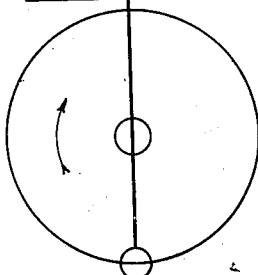
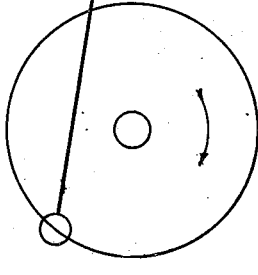
Inventor:
Franz Lang
By Luther Johns
Atty.

Patented Oct. 11, 1927.

1,645,199

UNITED STATES PATENT OFFICE.

FRANZ LANG, OF MUNICH-NYMPHENBURG, GERMANY, ASSIGNOR TO ACRO AKTIEN-GESELLSCHAFT, OF KUSSNACHT-ON-THE-RIGI, SWITZERLAND.

TWO-CYCLE INTERNAL-COMBUSTION ENGINE.

Application filed May 5, 1923, Serial No. 636,931, and in Germany May 9, 1922.

The present improvements relate more particularly to a method and means for supplying air or air-and-fuel to the compression side of the cylinder of a two cycle internal combustion engine and for exhausting the products of combustion therefrom.

Its objects are to increase efficiency and to avoid the waste of fuel in instances where fuel-and-air are admitted at the intake port or ports.

It is a well-known expedient to arrange the exhaust openings in the cylinder of two-cycle internal combustion engines so that a part of the exhaust-opening is uncovered by the piston in advance of the inlet opening, so that a portion of the gases of combustion is removed from the cylinder and the pressure in the cylinder reduced before the inlet opening for the fuel-charge begins to be uncovered. Such two-cycle engines have, however, not led to solving the problem of obtaining a thorough clearing or scavenging of the cylinder of the products of combustion without entailing the disadvantage of a considerable loss and waste of fuel.

Under my present invention this waste of fuel is eliminated and a consequent increase of efficiency is attained by providing an outlet for the products of combustion from the cylinder of reduced upper width or cross-section, while making the inlet of the charge of air or of air-and-fuel to the cylinder effectively lower than the higher reduced cross-sections of the outlet but higher than any width or cross-section of such outlet having the full width of said outlet or, more specifically considered with respect to the preferred exemplification of carrying out my invention, as shown in the drawing, by giving a portion of the exhaust ports or slits a greater height than the remainder, while the height of the inlet ports for fuel or fuel and air is somewhat lower than that of the higher exhaust ports, but higher than the remainder of said exhaust ports. At the same time the aggregate area of the charging or inlet ports is preferably larger than that of the exhaust ports in the aggregate.

In the accompanying drawings, which form a part of this specification, Figure 1 shows a fragment of the inner surface of a two-cycle engine cylinder wall as it would appear laid out in a plane and exhibiting an inlet for the charge of air or air-and-fuel, the inlet in the present exemplification being in the form of a plurality of intake ports or openings of well-known form and arrangement; Fig. 2 is a similar view showing the outlet for the products of combustion consisting in the present illustration of my invention in a number of exhaust ports or outlet openings arranged with respect to each other and with respect to the intake ports to carry out the present improvements; and Figs. 3, 4 and 5 are partially diagrammatic views showing in medial vertical section a cylinder and piston in various relative positions with respect to the intake and outlet ports shown in Figs. 1 and 2.

It has heretofore been established that the intake ports should have a combined area greater than that of the exhaust ports, and in the accompanying drawings the combined area of the intake ports 10 is greater than that of the exhaust ports 11 and 12.

From Figs. 1 and 2 it will appear that under the preferred arrangement embodying my invention the exhaust ports 11 are effectively higher than the intake ports 10, and that the exhaust ports 12 are effectively lower than the intake ports 10, the terms "higher" and "lower" having reference to the piston movement whether the movement be actually vertical or horizontal. For illustration I have shown two of the higher ports 11 and a total of eight intake ports, and eight exhaust ports, all of the ports being shown as having a common width. With an understanding of the present invention as explained herein anyone skilled in the art will readily vary the relative height of the several ports, their respective capacities and the number of them employed, all according to particular conditions or the size of engine to which these improvements may be applied.

Figs. 3, 4 and 5 show the piston 14 moving relative to the various ports in the cylinder 15. For present considerations the effective top of the piston is at 16, being the place or line where the ports are first uncovered or the opening of them initiated in the outward or power stroke of the piston, and the place or line where the ports are finally closed on the compression stroke.

Fig. 3 shows the piston 14 as having descended to a place where the intake port 10 is still closed but is about to be opened. At the same instant the effective top of the piston at 16 has opened the ports 11 to the extent of the difference in height between the ports 10 and 11 as shown by a dotted line in Figs. 1 and 2.

Fig. 4 shows the piston at the end of its power stroke with all of the intake ports 10 completely opened and all of the exhaust ports 11 and 12 completely opened. Fig. 5 shows the piston ascending and as having reached a relative position in which the intake port 10 is partially closed, the exhaust ports 12 completely closed, and the exhaust ports 11 still remaining open at their respective top portions.

The result of the arrangement illustrated is to provide near the end of the explosion stroke of the engine a preliminary discharge of the gases of combustion through the top portions of the ports 11, as illustrated in Fig. 3, before the initiation of intake through the ports 10. This first or preliminary exhaust, taking place under high pressure, induces a suction action upon the remaining contents of the cylinder favorable to elimination of the gases. The intake ports 10 then begin to open and the charge, that is to say, air under pressure or an air-and-fuel mixture under pressure begins to be admitted through the ports 10.

The preliminary discharge from the ports 11 also causes a materially great drop in the pressure of the gases, facilitating the admission of fresh air or an air-and-fuel mixture. While the intake openings 10 are becoming effectively greater, further exhaust is initiated through the uncovering of the top portions of the ports 12, and all of the ports thence effectively increase in area, with the result that when the maximum of intake is reached there is present also the maximum of exhaust, a condition favorable to the complete scavenging of the cylinder.

An objection to the operation of two-cycle engines has been not only the failure satisfactorily to scavenge the cylinder of the products of combustion, but also the loss of fuel where a combustible mixture is forced into the cylinder through intake ports as 10, some of this fuel necessarily passing out with the exhaust. An important result of the present improvements in that respect is had on the up stroke closing the various ports. The scavenging takes place so long as portions of the exhaust ports 10 and 11 remain open; but it will be noted from Fig. 5 that when the piston has moved upward to the height of the exhaust ports 12 there remains open only that relatively small amount for exhaust as is defined by the upper portions of the ports 11, the combined area of these upper portions being relatively small. At the same time the intake ports 10 are still open to a materially great extent and the air or air-and-fuel, either of which media I designate generically as the charge, continues to enter and enrich the mixture in the cylinder while only a relatively small amount is permitted to escape through the upper portions of the ports 11. Through the initial or preliminary exhaust and its effect upon the exhaust through the ports 12 and the lower portions of the ports 11 such an effective scavenging takes place that closing the ports 12 relatively early on the up stroke is without prejudice to the desired result, and thus the escape of fuel through those ports is greatly limited. When the intake ports are closed the pressure at the intake is, of course, stopped, reducing outflow, and since the height of the ports 11 is only slightly greater than that of the intake ports and the upward movement of the piston is at a relatively rapid stage, there is only a very slight loss of fuel just before the exhaust ports 11 are completely closed, and at the same time the advantage is had of some further scavenging.

From a consideration of the above it will be observed that what characterizes my invention in principle is that under it the outlet for the products of combustion from the cylinder is reduced in width or cross-section at its upper portion, the inlet for the charge to said cylinder being effectively somewhat lower than the higher reduced widths or cross-sections of said outlet, but higher than any cross-section of such outlet having the full width of such outlet.

I am aware that it has been suggested to have exhaust ports higher than inlet ports, and to have inlet ports higher than exhaust ports; but I am not aware that it has heretofore been suggested to have an outlet for the products of combustion from the cylinder reduced in upper width or cross-section, while making the inlet for the charge effectively lower than the higher reduced cross-sections of said outlet, but higher than any cross-section of such outlet having the full width or, more specifically, an outlet port or ports relatively high and of relatively small cross-area to produce a preliminary exhaust with advantages as herein pointed out, such preliminary exhaust being followed by intake, and the opening of an intake port or ports being followed by a relatively large opening of exhaust ports at the end of the expansion or power stroke of the piston, while at the start of the compression-stroke of said piston the rate of diminution of the exhaust is increased while the admission of charge continues, with or without a subsequent cutting off of the charge anterior to cutting off the constantly diminishing exhaust.

It will be apparent to those skilled in the art that while I have shown the inlet for the charge and the outlet for the products of combustion in the form of a plurality of intake ports and a plurality of exhaust ports the invention may be practiced in the use of a single intake port and an outlet port or ports formed and arranged to function to the same effect as the plurality of ports shown, all according to particular conditions, the size of the engine, and other familiar considerations with which the present improvements are not concerned.

I contemplate as being included herein such changes, departures and modifications from what is herein specifically illustrated and described as fall within the scope of the appended claims.

I claim:

1. In a two-cycle internal combustion engine having a cylinder, and therein a reciprocating piston, the cylinder having a plurality of intake ports and a plurality of exhaust ports, some of the exhaust ports being of less effective height than the effective height of the intake ports, a portion of the exhaust ports having an effective height greater than that of the intake ports, to provide on the compression stroke of the piston a reduction of the exhaust concurrently with a continuation of the intake.

2. In a two-cycle internal combustion engine having a cylinder, and therein a reciprocating piston, the cylinder having a plurality of intake ports of a substantially common effective height and a plurality of relatively low exhaust ports of less effective height than the effective height of the intake ports and a relatively high exhaust port having an effective height greater than that of the intake ports, to provide on the power-stroke of the piston a reduction of the exhaust coincidently with a continuation of the intake.

3. In a two-cycle internal combustion engine, a cylinder in combination with a piston, the cylinder being provided with an intake opening, and an exhaust opening of reduced upper cross-section, the intake opening being effectively lower than the higher reduced cross-section of the exhaust opening, but higher than any cross-section having the full width of the exhaust-opening.

4. In a two-cycle internal combustion engine, a cylinder in combination with a piston, the cylinder being provided with intake-ports and exhaust ports, a portion of the exhaust-ports being higher than and each having an area greater than each intake port, the remainder of the exhaust-ports being lower than and each having an area greater than that of each intake port.

5. In a two-cycle internal combustion engine, a cylinder in combination with a piston, the cylinder being provided with intake ports and exhaust ports, the aggregate area of the intake ports being greater than that of the exhaust ports, a portion of the exhaust-ports being higher than any one of the intake ports, the rest of the exhaust-ports being lower than any one of said intake-ports.

6. In a two-cycle internal combustion engine, a cylinder in combination with a piston, the cylinder being provided with an intake opening and an exhaust opening of reduced upper width, the intake being so arranged as to be uncovered by the piston after the uncovering of the reduced upper portion of the exhaust-opening has begun but before the uncovering of the unreduced portion of said exhaust opening has begun on the power-stroke of the piston, while, on the compression-stroke, the intake opening is closed after the closure of the unreduced part of the exhaust opening, but before the closure of said reduced portion of said exhaust opening.

7. In exhausting and charging the cylinder of a two-cycle internal combustion engine, the method which comprises, as a sequence of operations, first effecting, at the end of the power-stroke, a preliminary relatively small exhaust of products of combustion, then initiating the admission of the charge while the exhaust continues, then effecting a relatively large exhaust of products of combustion while the admission of charge continues, then, at the commencement of the compression stroke, diminishing the rate of exhaust while the admission of charge continues, then cutting off the charge anterior to cutting off the constantly diminishing exhaust.

In testimony whereof I affix my signature.

FRANZ LANG.